Jan. 1, 19 3,783,065

METHOD FOR SPLICING LIQUID-CORE OPTICAL FIBERS

Filed June 12, 1972 2 Sheets-Sheet 1

United States Patent Office
3,783,065
Patented Jan. 1, 1974

3,783,065
METHOD FOR SPLICING LIQUID-CORE OPTICAL FIBERS

Julian Stone, Rumson, N.J., assignor to Bell Telephone Laboratories, Incorporated, Murray Hill, N.J.
Filed June 12, 1972, Ser. No. 262,088
Int. Cl. B65h 69/02, 69/06
U.S. Cl. 156—158                    4 Claims

ABSTRACT OF THE DISCLOSURE

Groups of liquid-core optical fibers are spliced together by means including a grooved cover plate wherein the grooves are connected together by means of a common manifold. Pairs of fibers on the two fiber group segments to be spliced are mounted on the splacing apparatus in approximate longitudinal alignment and spaced apart a distance preferably less than a core diameter. The grooved cover plate is then positioned over the adjacent fiber ends and bonded thereto. This serves to align the fibers more accurately and to seal the space between them. Some of the gas trapped between the fibers is then withdrawn through the manifold and replaced by additional core fluid. The manifold is then sealed, completing the splice.

This application relates to liquid core optical fibers, and apparatus and method for splicing such fibers.

BACKGROUND OF THE INVENTION

There is, currently, a great deal of interest in the use of dielectric fibers as waveguides at optical frequencies in much the same way as wires and metallic waveguides are used at the lower frequencies. However, if such fibers are to be used in this manner, it is evident that there will be a corresponding need for a quick, convenient and inexpensive means for splicing sections of fibers together in the course of their use.

In a copending application by E. A. J. Marcatili, Ser. No. 262,002, filed June 12, 1972, and assigned to applicant's assignee, a number of fiber structures are described along with various methods and apparatus for splicing such fibers.

In particular, one method for splicing liquid core fibers is disclosed which employs solid, dielectric pins for aligning and coupling purposes. The present invention relates to alternate methods and apparatus for splicing such fibers.

SUMMARY OF THE INVENTION

In accordance with the present invention, groups of liquid core fibers, mounted on a ribbon-like tape, are spliced together by means including a grooved cover plate similar to the one used by Marcatili in his above-identified copending application. The cover plate, however, is modified such that the grooves connect to a common manifold. Pairs of fibers on the two fiber group segments to be spliced are mounted on the splicing apparatus in approximate longitudinal alignment and spaced apart a distance preferably less than a core diameter. The grooved cover plate is then positioned over the adjacent fiber ends and bonded thereto. This serves to align the fibers more accurately, and to seal the space between them. Some of the gas that may have accumulated at the fiber ends is withdrawn through the manifold, and replaced by additional core fluid. The manifold is then sealed, completing the splice.

It is an advantage of the present invention that the fibers are automatically aligned during the course of the splicing procedure by solely mechanical means. No special optical equipment or special alignment procedures are required.

These and other objects and advantages, the nature of the present invention, and its various features, will appear more fully upon consideration of the illustrative embodiment now to be described in detail in connection with the accompanying drawings.

DETAILED DESCRIPTION

Figure 1:
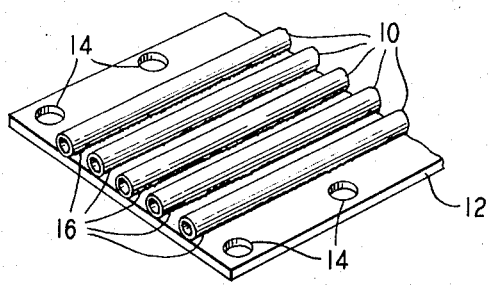
FIG. 1 shows one embodiment of a liquid core fiber group.

Referring to the drawings, FIGS. 1 shows one embodiment of a group of liquid core fibers to which the present invention relates. Briefly, the fibers 10 are mounted on a ribbon-like tape 12. For reasons which will become apparent hereinbelow, the fibers are uniformly spaced from each other, and secured in a manner to permit some slight transverse movement when forced. In the particular embodiment illustrated, each of the fibers is cemented, or otherwise secured to tape 12 over a very limited portion of its circumference. In particular, the joining material 16 should not extend beyond the lower half of the fiber circumference. Other ways of holding the fibers in place, such as a second conforming cover tape, described in the above-identified copending application, can alternatively be used. However, for the purposes of the present discussion the embodiment of FIG. 1 is adequate.

In addition, tape 12 is supplied with uniformity spaced registration holes 14 along at least one, but preferably along both sides.

Though not specifically shown, a plurality of such fiber groups can be disposed within a common enclosure to form fiber cables.

Fibers are typically spliced either to lengthen them or to repair a break. In the former situation, and in some instances of the latter as well, the fiber sections to be spliced will have been prepared for splicing at the factory. As such, certain steps, including cutting the fiber ends evenly, will not be necessary. On the other hand, repairing breaks by splicing the existing fibers will, in general, require a number of preparatory steps. In the discussion that follows, most of the more common preparatory steps will be included in the discussion for purposes of completeness.

Figure 2:
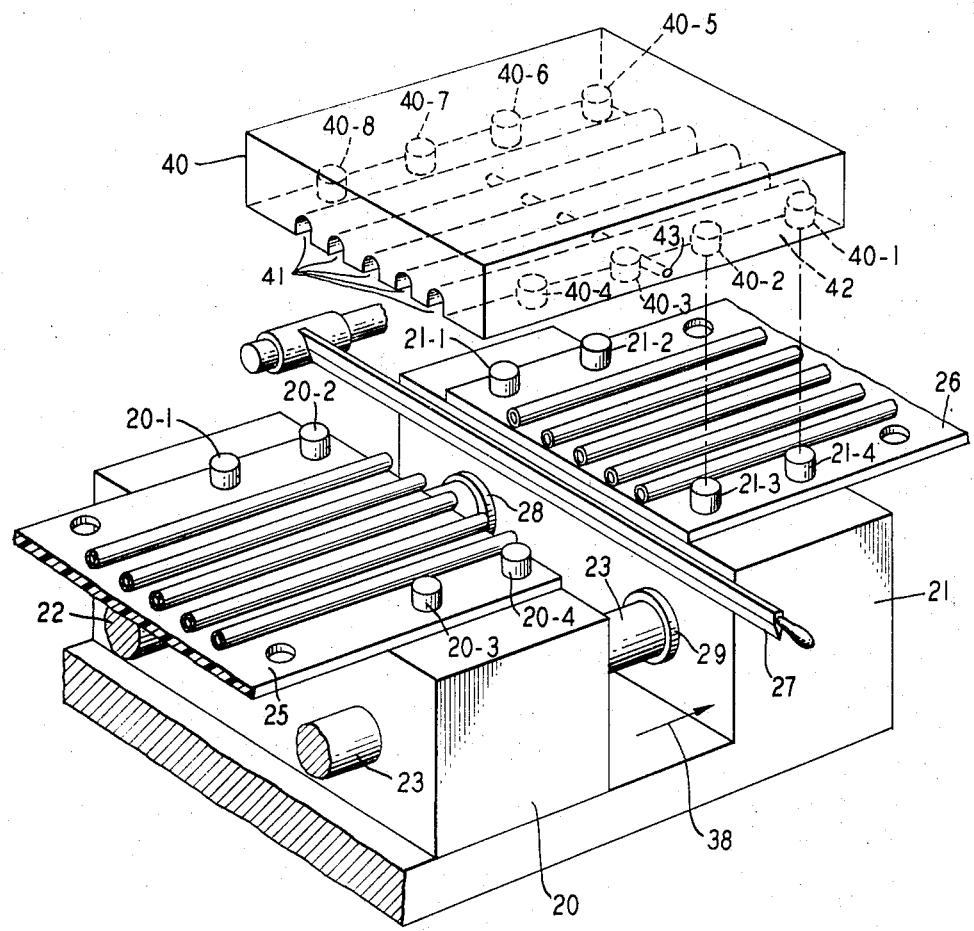
FIG. 2 shows a fiber splicer.

The above-described arrangements of fibers are spliced by means of a splicer, whose essential parts are illustrated in FIG. 2. Basically, the splicer comprises a pair of holders 20 and 21 upon which the fiber group segments to be spliced are placed. In particular, each of the holders is provided with registration posts 20–1 . . . 20–4 and 21–1 . . . 21–4 of a size and distribution to correspond to the registration holes 14 along the edges of the tapes. In addition, one of the holders, 20, is slideably mounted on a pair of rods 22 and 23 so that it can be moved relative to holder 21, as indicated by arrow 38.

To make a splice, the two fiber segments 25 and 26 are placed upon the holders 20 and 21, respectively, with the registration posts of the latter extending through the registration holes along the tapes. So mounted, the individual fibers are approximately coaxially aligned within the tolerance limits set by the manufacturing process. The ends of the fibers and the tapes are then cut flush with the adjacent ends of the holders, if necessary, by means of a suitable cutter 27, or in the manner described by D. L. Bisbee in his article entitled "Optical Fiber Joining Technique" published in the December 1971 issue of the Bell System Technical Journal, pp. 3155–3158.

The holders are then pushed together such that adjacent fiber ends are spaced apart a small distance, preferably a core diameter or less. This can be done by placing spacers 28 and 29 along rods 22 and 23, respectively.

The space between the adjacent tape ends is then filled in by means of a suitable bonding material. In addition to securing the tape ends, the bonding material serves to seal the underside of the fiber groups.

Figure 3:
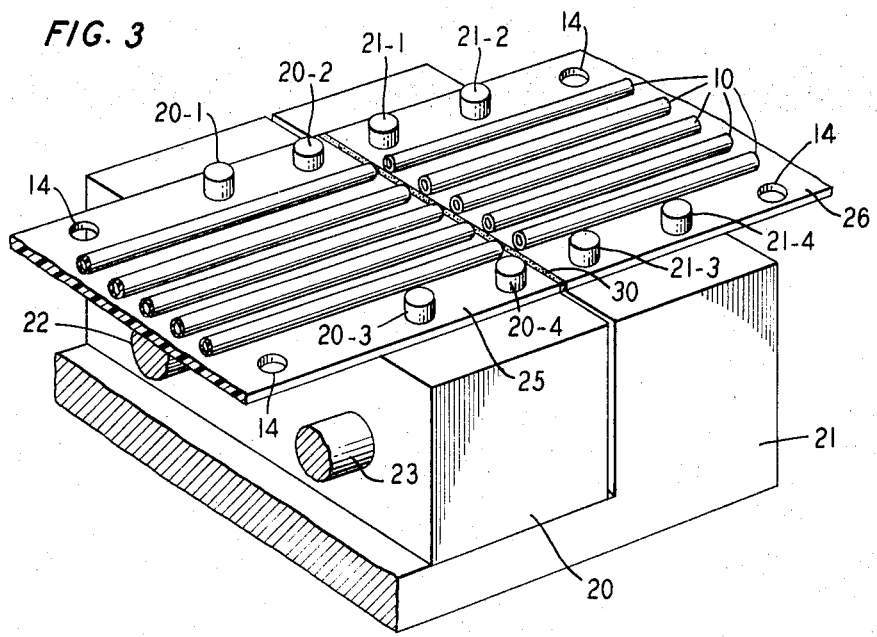
FIG. 3 shows two fiber group segments in splicing position.

FIG. 3 shows the two fiber group segments 25 and 26 in splicing position, and the space between the tape ends filled in by means of suitable bonding material 30. Most of any of the well-known epoxy cements can be used for this purpose.

As indicated hereinabove, the accuracy of the initial alignment of the fibers is a function of the tolerance limits inherent in the fiber manufacturing process. However, it is known that the transmission efficiency of the splice will fall off markedly with even a very slight transverse misalignment of the longitudinal axes of the two fibers. Accordingly, a final, more accurate alignment is made by means of the grooved cover plate 40, shown in FIG. 2. As shown, the latter is provided with a plurality of accurately made grooves 41, each of whose transverse dimension is equal to the outside diameter of the fibers. Thus, when the plate is placed in position over the fiber ends, the fibers are automatically forced into a more accurate alignment.

In addition, the grooves in plate 40 are all connected to a common manifold 43 which extends transversely from plate side 42 through each of the grooves 41.

Figure 4:
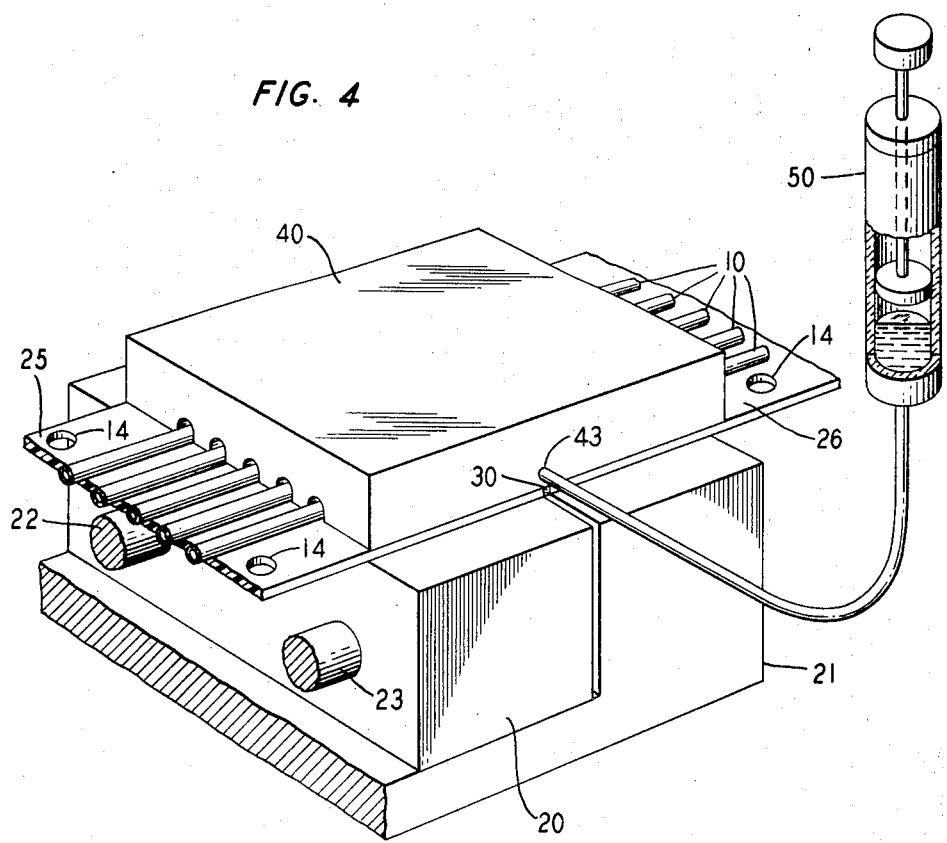
FIG. 4 shows a cover plate over the two fiber group segments shown in FIG. 3.

To complete the splice, cover plate 40 is placed over the adjacent ends of the fiber segments, as illustrated in FIG. 4, and bonded thereto either by a cement or thermally, depending upon the materials being used. This serves both to align the fiber ends more accurately and, in addition, to seal off the space between the adjacent fibers.

Some of the gas trapped within the sealed off region is then withdrawn by such means as a hypodermic syringe 50 connected to manifold 43, and is replaced by additional core fluid. This is done by partially withdrawing the syringe plunger and allowing the bubble produced by the trapped gas to rise through the core fluid in the syringe. The plunger is then depressed, filling the enclosed space between the fiber groups with additional core fluid. The syringe is then withdrawn, and the manifold sealed, thus completing the splice. The seal can be made thermally or mechanically.

The cover plate, in this arrangement, serves to align the fibers, to contain the added core material and, finally, to strengthen the splice. The added core material, by filling in the space between the fibers, provides the optical coupling.

Since the cover plate becomes an integral part of the splice, it is advantageously made of a plastic, or other comparable material, and the grooves embossed thereon by heating and then pressing the heated plate onto a mold. Cover plates can be manufactured inexpensively and in large numbers by this relatively simple means.

It will be appreciated that the specific embodiment of the splicer illustrated in FIG. 2 is merely representative of the essential elements of such a device. Thus, in all cases it is understood that the above-described aparatus and method are illustrative of only one of the many possible specific embodiments which can represent applications of the principles of the invention. Numerous and varied other arrangements can readily be devised in acordance with these principles by those skilled in the art without departing from the spirit and scope of the invention.

What is claimed is:

1. A method of splicing two groups of liquid-core optical fibers, wherein each of said groups comprising a plurality of fibers mounted on a ribbon-like tape, including the steps of:

placing the two fiber groups to be spliced in approximate longitudinal alignment and spaced slightly apart;

enclosing, sealing and more accurately aligning said fibers;

and withdrawing some of the gas trapped between said aligned fibers and replacing with additional core fluid.

2. The method according to claim 1 wherein said fibers are spaced apart a distance less than one core diameter.

3. The method according to claim 1 wherein said means for enclosing, sealing and aligning said fibers comprises a grooved cover plate whose grooves are connected to a common manifold, and wherein said gas is withdrawn and said core fluid is added through said manifold.

4. The method according to claim 1 including the added step of sealing said manifold after said core fluid is added.

References Cited

UNITED STATES PATENTS 3,455,625   7/1969   Brumley et al. _____ 350—96

WILLIAM A. POWELL, Primary Examiner

U.S. Cl. X.R.

156—87, 159, 304, 502, 546; 161—143; 350—96 B